(12) United States Patent
Harris et al.

(10) Patent No.: US 8,472,307 B1
(45) Date of Patent: Jun. 25, 2013

(54) CHANNELIZATION CIRCUITS HAVING MULTIPLE COMMUTATORS

(75) Inventors: Frederic J. Harris, Lemon Grove, CA (US); Christopher H. Dick, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 324 days.

(21) Appl. No.: 12/968,036

(22) Filed: Dec. 14, 2010

(51) Int. Cl.
*H04J 11/00* (2006.01)

(52) U.S. Cl.
USPC .......................................... 370/208; 370/342

(58) Field of Classification Search
USPC .................. 370/208–211, 348; 375/222–228, 375/286
See application file for complete search history.

(56) References Cited

U.S. PATENT DOCUMENTS

| | | | | |
|---|---|---|---|---|
| 7,145,972 | B2 * | 12/2006 | Kumar et al. | 375/349 |
| 2003/0223503 | A1 * | 12/2003 | Song | 375/260 |
| 2005/0276335 | A1 * | 12/2005 | Kumar | 375/260 |
| 2010/0091825 | A1 * | 4/2010 | Cannon et al. | 375/222 |

OTHER PUBLICATIONS

Eghbali, Amir et al., "Dynamic Frequency-Band Reallocation and Allocation: from Satellite-Based Communication Systems to Cognitive Radios," *J Sign Process Syst*, Oct. 14, 2008, pp. 1-17, Springer Science & Business Media, LLC, New York, New York, USA.

Harris, Fred et al., "Digital Receivers and Transmitters Using Polyphase Filter Banks for Wireless Communications," *IEEE Transactions on Microwave Theory and Techniques*, Apr. 8, 2003, vol. 51, Issue 4, pp. 1395-1412, IEEE, Piscataway, New Jersey, USA.

Savir, Gil *Scalable & Reconfigurable Software Defined Radio: Digital Front-End Architecture for Wideband Channelizer*, Mar. 15, 2006, pp. 1-35, Delft University of Technology, Computer Engineering Colloquium, Delft, Netherlands.

* cited by examiner

*Primary Examiner* — Gary Mui
(74) *Attorney, Agent, or Firm* — LeRoy D. Maunu

(57) ABSTRACT

A channelization circuit channelizes baseband signals in the channels of a wideband signal. The channelization circuit includes a phase shifter, a Fourier transform circuit, filtering circuits, commutator circuits, and a summation circuit. The phase shifter circuit is configured to receive the baseband signals. The Fourier transform circuit is coupled to the phase shifter circuit and configured to frequency translate the baseband signals to the channels of the wideband signal. The filtering circuits are coupled to the Fourier transform circuit, and the commutator circuits are coupled to the filtering circuits. The summation circuit is coupled to the commutator circuits and configured to generate the wideband signal.

17 Claims, 4 Drawing Sheets

US 8,472,307 B1

CHANNELIZATION CIRCUITS HAVING MULTIPLE COMMUTATORS

FIELD OF THE INVENTION

One or more embodiments generally relate to multichannel signal modulation, and more particularly to polyphase filter banks.

BACKGROUND

Multicarrier modulation techniques, such as frequency division multiplexing (FDM), have become widely used in many high-speed communication applications. In multicarrier modulation, a multichannel digital transmitter simultaneously frequency translates a number of baseband signals into a set of carrier-band channels in a single wideband composite signal. A receiver may demodulate one or more of the channels of the wideband composite signal to the baseband.

One notable application of multicarrier modulation is cable television transmission. A cable television waveform is formed by frequency translating multiple baseband signals to a set of carrier channels, each baseband signal representing one television signal. Each baseband signal is placed at a unique center frequency of a respective channel according to an FDM mapping scheme.

Multichannel modulation devices may employ various topologies and architectures. In one approach, modulation circuitry is duplicated for each channel. A composite wideband signal is generated from several carrier band signals using multiple up-converter circuits, one for each baseband channel. This approach offers a large degree of freedom on how pulse shaping and up-conversion are managed for each channel. As a result, the modulation of each channel may be set to adjust the center frequency, bandwidth, and channel spacing independent of the other channels. However, this approach is computationally expensive and may be prohibitive as the number of channels increases.

Another modulation technique utilizes polyphase filter banks to simultaneously place the baseband signals on a set of equally spaced channels. In this approach, a Fourier transform is performed in combination with polyphase filtering. The Fourier transform synthesizes a series of narrow bandwidth channels. A polyphase filter rejects extraneous spectral images of the baseband signals and shapes the bandwidth of the baseband signals in the channels. A combiner assembles a single wideband composite signal. Existing polyphase filter banks require a strict coupling between the sample rate of each baseband channel, the Fourier transform length (typically equaling the number of baseband signals), the frequency spacing of the channels in the composite wideband signal, and the sample rate of the composite wideband signal.

One or more embodiments may address one or more of the above issues.

SUMMARY

In one embodiment, a channelization circuit channelizes baseband signals in the channels of a wideband signal. The channelization circuit includes a phase shifter, a Fourier transform circuit, filtering circuits, commutator circuits, and a summation circuit. The phase shifter circuit is configured to receive the baseband signals. The Fourier transform circuit is coupled to the phase shifter circuit and configured to frequency translate the baseband signals to the channels of the wideband signal. The filtering circuits are coupled to the Fourier transform circuit, and the commutator circuits are coupled to the filtering circuits. The summation circuit is coupled to the commutator circuits and configured to generate the wideband signal.

In another embodiment, a channelization circuit channelizes M baseband signals into M channels of a wideband signal. The channelization circuit includes a phase shifter, an M-point Fourier transform circuit, M filtering circuits, P commutator circuits, and a summation circuit. The phase shifter circuit is configured to generate M phase-shifted signals that phase shift the M baseband signals by P complex roots of unity, with P evenly dividing M without any remainder. The M-point Fourier transform circuit is coupled to the phase shifter circuit and configured to frequency translate the M phase-shifted signals into the M channels of the wideband signal. The M filtering circuits are coupled to the M-point Fourier transform circuit and configured to filter the M channels. The P commutator circuits are coupled to the M filtering circuits and configured to up-sample by an integer factor that is M evenly divided by P. The summation circuit is coupled to the P commutator circuits and configured to generate the wideband signal.

It will be appreciated that one or more other embodiments are set forth in the Detailed Description and Claims, which follow.

BRIEF DESCRIPTION OF THE DRAWINGS

Various advantages will become apparent upon review of the following detailed description and upon reference to the drawings, in which.

DETAILED DESCRIPTION

Multicarrier modulation frequency translates a number of baseband signals assembled in a set of frequency division multiplexed (FDM) channels within a single up-sampled wideband signal. For many applications, a polyphase filter bank architecture may be used to efficiently perform these tasks.

Existing polyphase filter banks use an M-point fast Fourier transform (FFT) to assemble up to M baseband signals into M channels of a wideband signal, while increasing the output sample rate of the wideband signal by the factor of M over the input sample rate of the individual baseband signals. Thus, the sample rate of the wideband signal equals M times the input sample rate of the individual baseband signals. The baseband signals are frequency translated into the M equally spaced channels, and the spacing between adjacent channels is constrained to equal an integer multiple of the input sample rate.

The described embodiments provide a polyphase filter bank architecture for a channelization circuit that removes the constraint that the output sample rate is a factor of M times the input sample rate of the up to M baseband signals. Instead, the output sample rate becomes Q=M/P times the input sample rate, for any integer P that evenly divides M. The constraint on the channel spacing similarly relaxes by the selected factor of P. In addition, the hardware resources, such as multiply-accumulate units, required to implement the channelization circuit are reduced by 40% to 60% over existing polyphase filter banks.

Future generation cable systems will include full-spectrum solutions, which in the U.S. means that 160 6 MHz channels will be placed into the approximately 1 GHz of spectrum that is available for delivery of cable services. Decoupling of the input and output sample rates and relaxing the channel spacing allows groups of channels to be packed efficiently in a full-spectrum solution for cable television.

Figure 1:
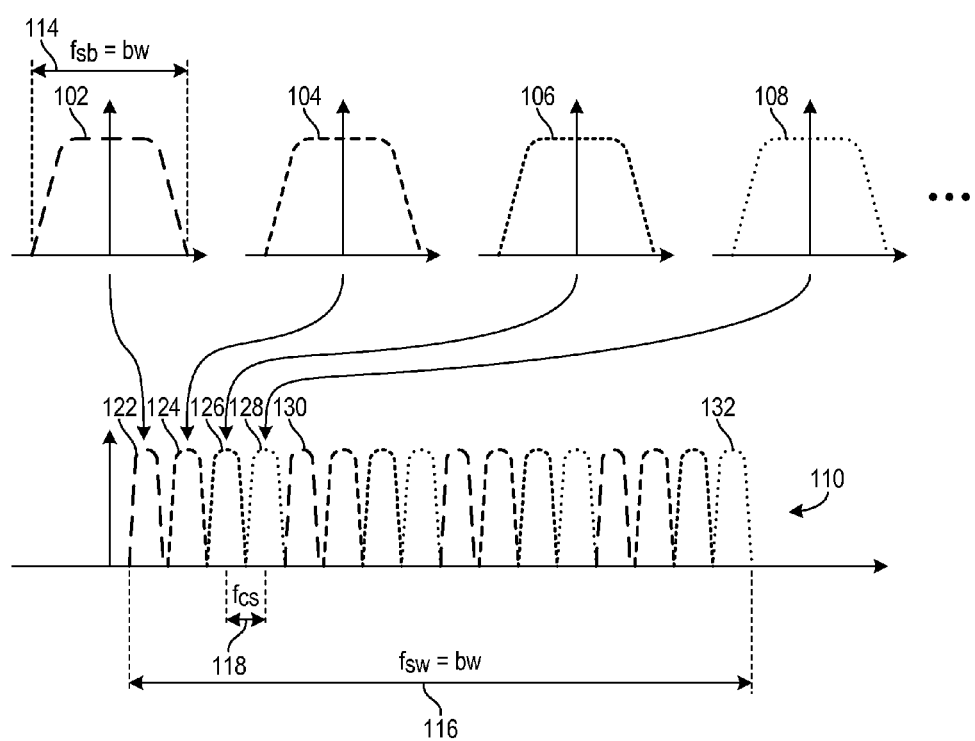
FIG. 1 shows an example of the assembly of multiple baseband signals into a frequency division multiplexed (FDM) wideband signal.

FIG. 1 shows an example of the assembly of multiple baseband signals into a frequency division multiplexed (FDM) wideband signal. In this example, M=16 baseband signals including baseband signals 102, 104, 106, and 108 are assembled into a wideband signal 110, and the output sample rate 116 is reduced by a factor of P=4 over existing polyphase filter banks. The output sample rate 116 becomes Q=M/P=16/4, or four times the input sample rate 114 shared by the baseband signals 102, 104, 106, 108, et cetera.

Baseband signal 102 is frequency translated (or up-converted) to channel 122; simultaneously, baseband signals 104, 106, and 108 are frequency translated to channels 124, 126, and 128, respectively. The other twelve baseband signals (not shown) are correspondingly frequency translated to channels 130 through 132.

The channel spacing 118 between adjacent channels, such as adjacent channels 126 and 128, is an integer multiple of the input sample rate 114 divided by P=4. This integer multiple has a value of one in the example of FIG. 1.

Figure 2:
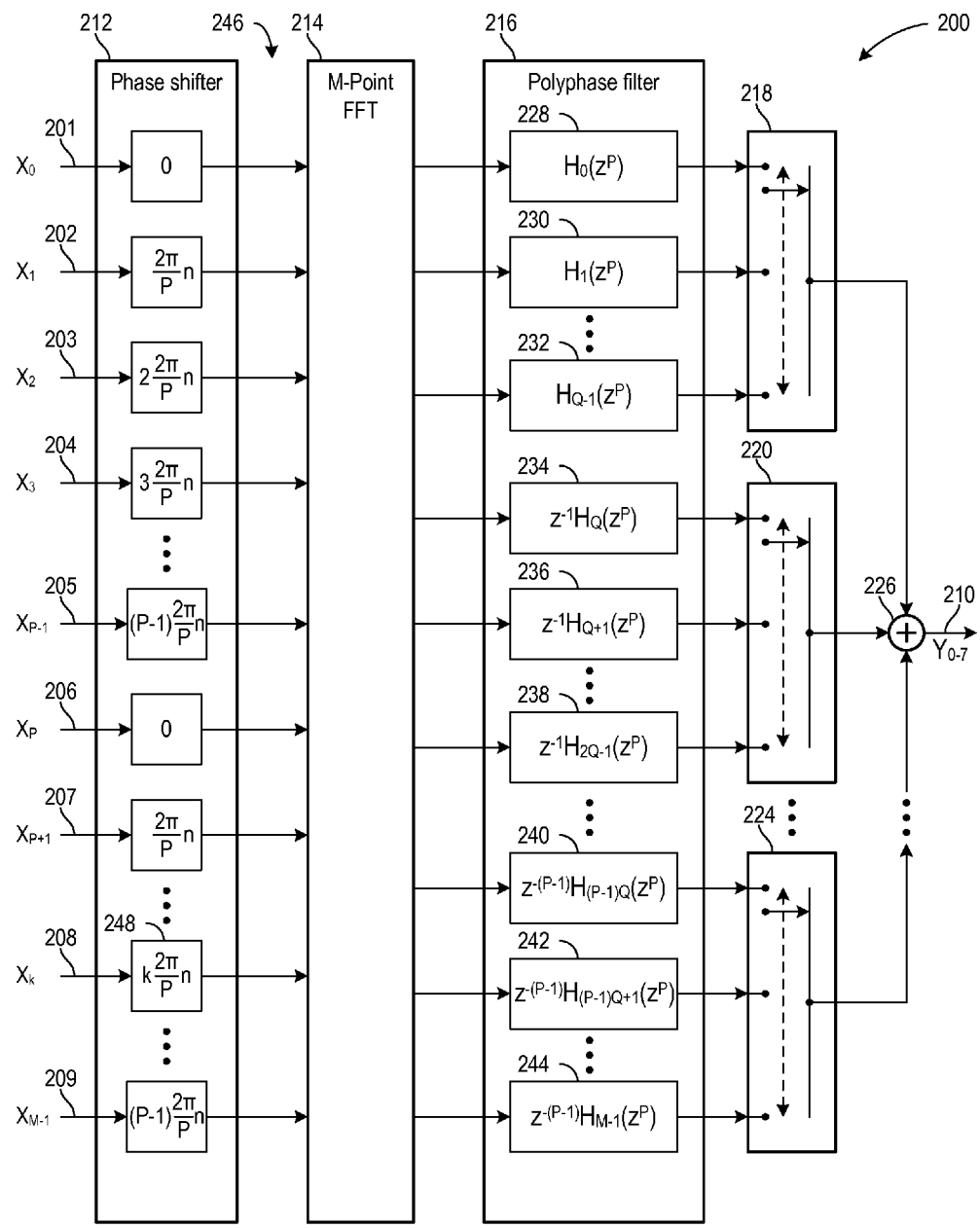
FIG. 2 shows a block diagram of an example channelization circuit configured to change the sample rate by a factor of M/P.

FIG. 2 shows a block diagram of an example implementation of a channelization circuit 200 configured to change the sample rate by a factor of M/P. The channelization circuit inputs up to M baseband signals including the baseband signals on lines 201, 202, 203, 204, 205, 206, 207, 208, and 209, and the channelization circuit outputs a wideband signal on line 210. The channelization circuit 200 constructs the wideband signal on line 210 that is a sum of up-sampled and frequency translated versions of the baseband signals on lines 201, 202, 203, 204, 205, 206, 207, 208, and 209. Each baseband signal is frequency translated into a respective channel of the wideband signal on line 210. The respective channel for each baseband signal is centered at one of the M complex roots of unity.

The output sample rate of the wideband signal on line 210 is a factor of M/P times the shared input sample rate of the baseband signals on lines 201, 202, 203, 204, 205, 206, 207, 208, and 209. P is selected from those integers that evenly divide M without any remainder. For example, if M is a power of two, then P is any lesser power of two.

The z-transform for creating a carrier centered wideband signal is:

$$H(z) = \sum_{n=0}^{N-1} h(n) e^{j\frac{2\pi}{M}kn} z^{-n} = \sum_{r=0}^{M-1} z^{-r} e^{j\frac{2\pi}{M}kr} \sum_{n=0}^{N-1} h(r+nM) z^{-nM}$$

and for any P that evenly divides M without any remainder, this z-transform can be rewritten as:

$$H(z) = e^{j\frac{2\pi}{P}k} \sum_{l=0}^{P-1} z^{-l\frac{M}{P}} \sum_{r=0}^{\frac{M}{P}-1} z^{-r} e^{j\frac{2\pi}{M}kr} \sum_{n=0}^{N-1} h(r+nM) z^{-nM}$$

and the rewritten z-transform shows the modifications required to support up-sampling by a factor of Q=M/P rather than the conventional up-sampling by a factor of M. The rewritten z-transform shows the polyphase polynomials in $z^M$, the frequency dependent phase shift from the factor of Q re-sampling, and the final down-sampling by the factor of P.

The channelization circuit 200 includes a phase shifter circuit 212, a Fourier transform circuit 214, a polyphase filter 216, commutator circuits 218 and 220 through 224, and summation circuit 226. The phase shifter circuit 212 is configured to receive the baseband signals on lines 201, 202, 203, 204, 205, 206, 207, 208, and 209. The Fourier transform circuit 214 is configured to frequency translate the baseband signals on lines 201, 202, 203, 204, 205, 206, 207, 208, and 209 to respective channels. The polyphase filter 216 includes a sequence of filtering circuits that include filtering circuits 228, 230, 232, 234, 236, 238, 240, 242, and 244. The commutator circuit 218 is coupled to filtering circuits 228 and 230 through 232, the commutator circuit 220 is coupled to filtering circuits 234 and 236 through 238, and the commutator circuit 224 is coupled to filtering circuits 240 and 242 through 244. The summation circuit 226 is configured to generate the wideband signal on line 210 by summing respective outputs of the commutator circuits 218 and 220 through 224.

In one embodiment, the Fourier transform circuit 214 is an M-point Fourier transform circuit supporting up to M baseband signals, the polyphase filter 216 includes M filtering circuits that include filtering circuits 228, 230, 232, 234, 236, 238, 240, 242, and 244, and the commutator circuits 218 and 220 through 224 are P commutator circuits, for any P that evenly divides M without any remainder.

The phase shifter circuit 212 is configured to generate M phase-shifted signals on lines 246 that phase shift the M baseband signals by the P complex roots of unity. The M-point Fourier transform circuit is configured to frequency translate the M phase-shifted signals on line 246 into the M channels. The filtering circuits of the polyphase filter 216 are configured to filter the M channels. The P commutator circuits 218 and 220 through 224 are configured to up-sample by an integer factor that is M evenly divided by P. The summation circuit 226 is coupled to the P commutator circuits for generating the wideband signal on line 210.

The baseband signals on lines 201, 202, 203, 204, 205, 206, 207, 208, and 209 share an input sample rate. The wideband signal on line 210 has an output sample rate that that is an integer multiple of the input sample rate, and the integer multiple is a result from evenly dividing M by P. Because P is two or more, the output sample rate of the wideband signal on line 210 is at least a reduction factor of two less than M times the input sample rate. While less than M baseband signals can be connected to the channelization circuit 200, the output sample rate of the wideband signal on line 210 is at least a reduction factor of two less than a product of the number of baseband signals and the input sample rate in one embodiment with M baseband signals. It will be appreciated that this reduction factor equals the number of commutator circuits 218 and 220 through 224.

In one embodiment, the spacing between the channels of the wideband signal on line 210 equals the output sample rate divided by M. This spacing also equals the input sample rate divided by P.

The phase shifter circuit 212 generates the M phase-shifted signals 246 that multiply the M baseband signals by the P complex roots of unity. The baseband signals include P subsets that have a respective ordinal number in a range from zero to P minus one. For example, the subset with ordinal number zero includes baseband signals 201 and 206, the subset with ordinal number one includes baseband signals 202 and 207, and the subset with ordinal number P minus one includes baseband signals 205 and 209. The phase shifter circuit 212 multiplies each baseband signal in each subset by powers of the complex root of unity corresponding to the respective ordinal number of the subset. For example, phase shifter block 248 multiplies the successive samples of baseband signal $X_k$ 208 by successive powers of $e^{jk2\pi/P}$, which is one of the P complex roots of unity. Thus, phase shifter block 248 does not shift the phase of sample zero of baseband signal $X_k$ 208, shifts the phase of sample one by $k2\pi/P$, shifts the phase of sample two by twice $k2\pi/P$, and so on. Similarly, phase shifter circuit 212 multiplies the successive samples of each baseband signal 202 and 207 in the subset with ordinal number one by successive powers of the first of the P complex roots of unity. Because the corresponding complex root of unity is unity for the subset with ordinal number zero, the phase shifter circuit 212 never phase shifts the samples of the baseband signals 201 and 206.

The polyphase filter 216 uses a sequence of filter coefficients specifying a retained bandwidth of the baseband signals in the channels of the wideband signal 210. Each filtering circuit 228, 230, 232, 234, 236, 238, 240, 242, and 244 has a respective ordinal number in a range from zero to M minus one, and each filtering circuit uses those filter coefficients in the sequence at the respective ordinal number plus the integer multiples of M.

The M filtering circuits in polyphase filter 216 include P subsets. Each of these subsets includes a number of the M filtering circuits equaling the integer factor resulting from evenly dividing M by P. Each subset has a respective ordinal number in a range from zero to P minus one. For example, the subset with ordinal number zero includes filtering circuits 228 and 230 through 232, the subset with ordinal number one includes filtering circuits 234 and 236 through 238, and the subset with ordinal number P minus one includes filtering circuits 240 and 242 through 244.

Associated with each subset is a time delay and a magnitude of the time delay equals a multiple of the input sample period, which is the inverse of the input sample rate of the baseband signals. This multiple of the input sample period equals the respective ordinal number of the subset. For example, filtering circuits 228 and 230 through 232 have a time delay with a magnitude of zero. Similarly, filtering circuits 234 and 236 through 238 have a time delay with a magnitude of one input sample period as shown with the factor of $z^{-1}$ included at the beginning of corresponding labels giving the z-transform for the filtering circuits 234 and 236 through 238.

Each of the P commutator circuits 218 and 220 through 224 is coupled to each filtering circuit in a respective one of the P subsets for up-sampling by a factor equaling the result from evenly dividing M by P. For example, commutator circuit 220 is coupled to each of the filtering circuits 234 and 236 through 238 in the subset with ordinal number one.

The summation circuit 226 sums the respective up-sampled outputs from the P commutator circuits 218 and 220 through 224.

Figure 3:
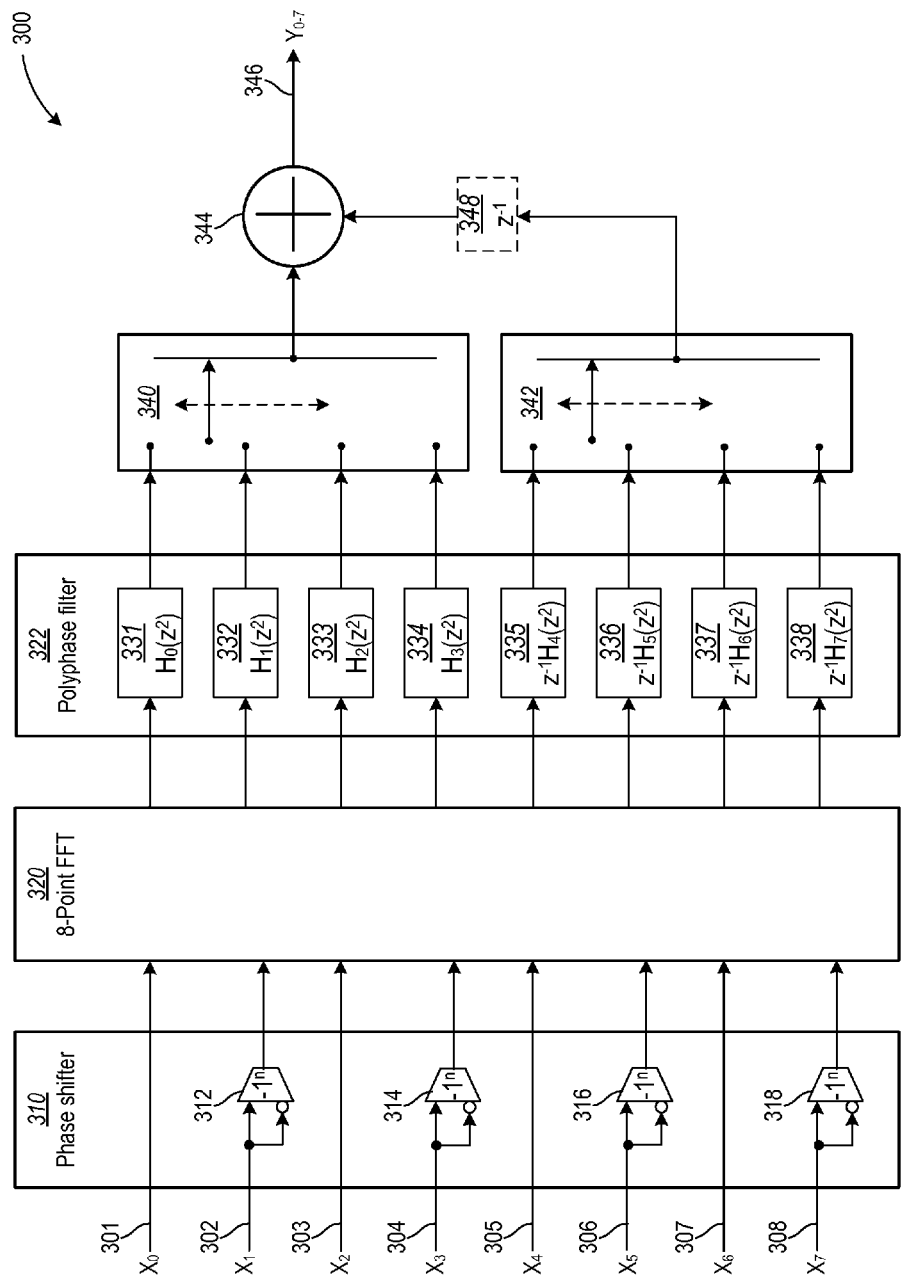
FIG. 3 shows a block diagram of an example channelization circuit configured to change the sample rate by a factor of M/P=8/2.

FIG. 3 shows a block diagram of an example implementation of a channelization circuit 300 configured to channelize M=8 baseband signals and change the sample rate by a factor of M/P=8/2. In this example implementation, the channelization circuit 300 is configured to process eight baseband signals on lines 301, 302, 303, 304, 305, 306, 307, and 308 at an input sample rate, and generate the wideband output signal on line 346 has an output sample rate that is M/P=8/2=four times the input sample rate.

A phase shifter circuit 310 shifts the respective phases of the baseband signals on lines 301, 302, 303, 304, 305, 306, 307, and 308. The baseband signals have respective ordinal numbers with the even baseband signals on lines 301, 303, 305, and 307 having an even ordinal number and the odd baseband signals on lines 302, 304, 306, and 308 having an odd ordinal number. The phase shifter circuit 310 is configured to pass the even baseband signals on lines 301, 303, 305, and 307 without any phase shift. The phase shifter circuit 310 includes respective multiplexers 312, 314, 316, and 318 for the odd baseband signals on lines 302, 304, 306, and 308. The multiplexers 312, 314, 316, and 318 selectively invert the odd baseband signals on lines 302, 304, 306, and 308, respectively. Each multiplexer 312, 314, 316, and 318 is configured to select an alternating one of the odd baseband signal and an inversion of the odd baseband signal. This does not shift the phase of the even samples of the odd baseband signals on lines 302, 304, 306, and 308, and shifts the phase of the odd samples by pi radians. Because of this, the in-phase component of the phase-shifted signal is either the incoming in-phase component or its inverse, and the quadrature-phase component of the phase-shifted signal is either the incoming quadrature-phase component or its inverse.

An 8-point fast Fourier transform circuit 320 frequency translates the baseband signals onto equally spaced channels. The channels from the fast Fourier transform circuit 320 are filtered by polyphase filter 322.

The polyphase filter 322 includes filtering circuits 331, 332, 333, 334, 335, 336, 337, and 338. The polyphase filter 322 uses a sequence of filter coefficients to reject extraneous spectral images and to shape the baseband signals' retained bandwidth in the channels of the wideband signal on line 346. These filter coefficients are distributed among the individual filtering circuits 331, 332, 333, 334, 335, 336, 337, and 338. For example, filtering circuit 331 uses every eighth filter coefficient beginning with the initial filter coefficient in the sequence, and filtering circuit 332 uses every eighth filter coefficients beginning with the next filter coefficient in the sequence.

Two commutators 340 and 342 up-sample the outputs of the polyphase filter 322. The polyphase filter 322 generates outputs at the input sample rate of the baseband signals on lines 301, 302, 303, 304, 305, 306, 307, and 308. Commutator 340 combines each set of four parallel outputs from filtering circuits 331, 332, 333, and 334 at the input sample rate into a temporal sequence of four samples at the higher output sample rate. Commutator 340 successively outputs a filtered sample from circuit 331, a filtered sample from circuit 332, a filtered sample from circuit 333, a filtered sample from circuit 334, and then circularly back to circuit 331. Commutator 342 similarly up-samples the filtered output from filtering circuits 335, 336, 337, and 338.

The up-sampling by commutators 340 and 342 increases the output sample rate to four times the input sample rate, and this factor of four equals the number of baseband signals on lines 301, 302, 303, 304, 305, 306, 307, and 308 divided by the number of commutators 340 and 342.

The summation circuit 344 sums the up-sampled outputs from commutator circuits 340 and 342 to generate the composite wideband signal on line 346.

The filtering circuits 335, 336, 337, and 338 are shown with an integrated delay of $z^{-1}$. In another embodiment, this delay is a respective delay register inserted between each filtering circuit 335, 336, 337, and 338 and the commutator circuit 342. In yet another embodiment, this delay is inserted between commutator circuit 342 and summation circuit 344 with a delay register 348 that operates at the output sample rate, such that summation circuit 344 successively sums the filtered outputs of circuits 332 and 335, the filtered outputs of circuits 333 and 336, the filtered outputs of circuits 334 and 337, and the filtered outputs of circuits 331 and 338.

In another embodiment for M=8 baseband signals that changes the sample rate by a factor of M/P=8/4, the phase shifter circuit 310 is modified to include multiplexers that selectively shift the phases of the baseband signals by multiples of ninety degrees, which are the four complex roots of unity. The baseband signals include four subsets with the first subset including baseband signals 301 and 305, the second subset including baseband signals baseband signals 302 and 306, the third subset including baseband signals 303 and 307, and the fourth subset including baseband signals 304 and 308. The phase shifter circuit is configured to pass the in-phase and quadrature-phase components of each baseband signal in the first subset. For each baseband signal in the second, third, and fourth subsets, the phase shifter circuit includes a first multiplexer configured to output an in-phase component and a second multiplexer configured to output a quadrature-phase component. For each baseband signal in the second subset, the first multiplexer selects a rotating one of the in-phase component of the baseband signal, the quadrature-phase component of the baseband signal, a first inverse of the in-phase component, and a second inverse of the quadrature-phase component, and the second multiplexer selects a rotating one of the quadrature-phase component, the first inverse, the second inverse, and the in-phase component. For each baseband signal in the third subset, the first multiplexer selects an alternating one of the in-phase component of the baseband signal and an inverse of the in-phase component, and the second multiplexer selects an alternating one of the quadrature phase component of the baseband signal and an inverse of the quadrature phase component. For each baseband signal in the fourth subset, the first multiplexer selects a rotating one of the in-phase component of the baseband signal, a first inverse of the quadrature-phase component of the baseband signal, a second inverse of the in-phase component, and the quadrature-phase component, and the second multiplexer selects a rotating one of the quadrature-phase component, the in-phase component, the first inverse, and the second inverse.

Figure 4:
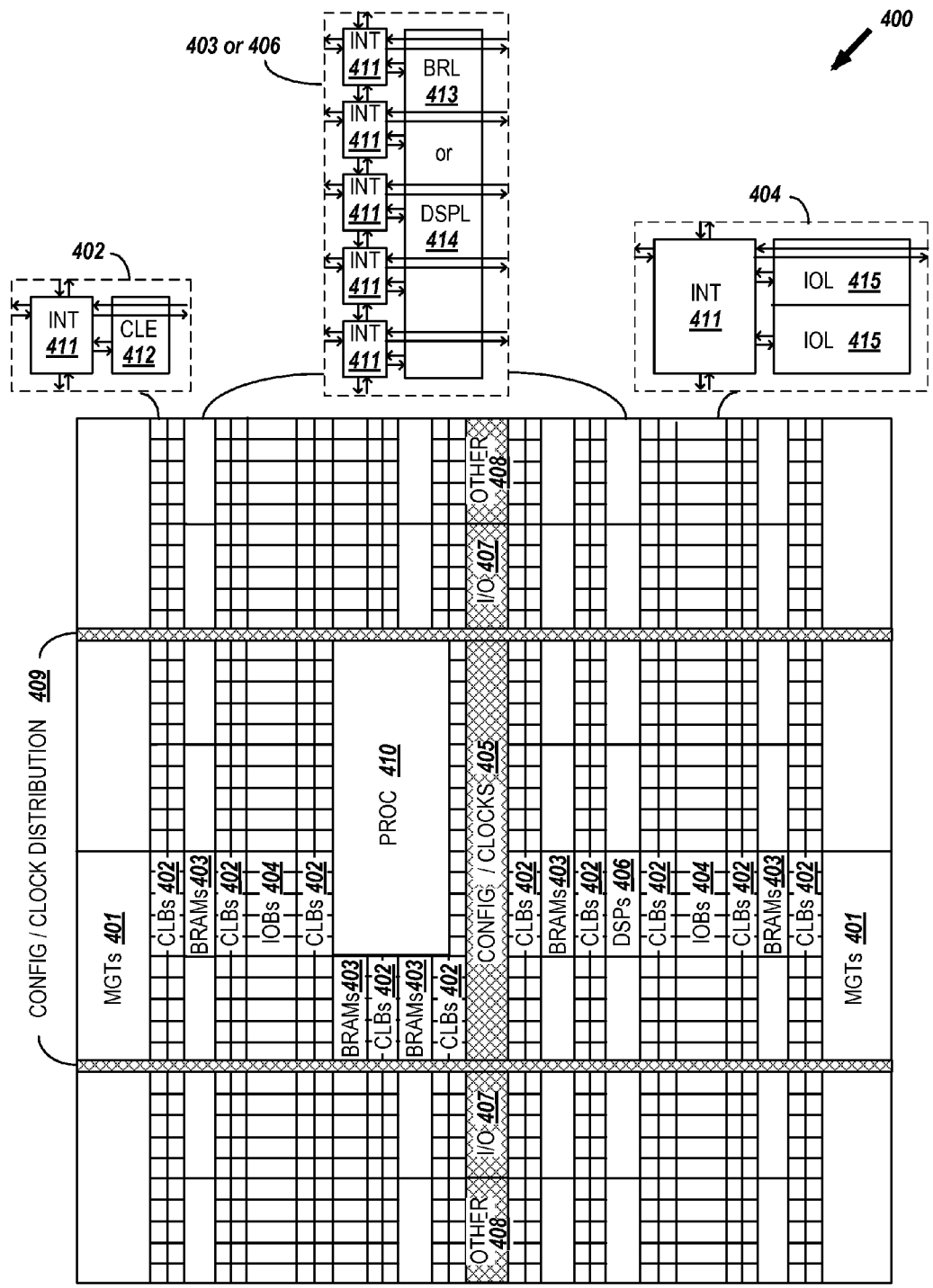
FIG. 4 is a block diagram of an example programmable logic integrated circuit that may be configured to implement a channelization circuit.

The various embodiments are scalable to process any number of baseband signals and may be implemented using ASIC or programmable logic circuitry. FIG. 4 is a block diagram of an example programmable integrated circuit that may be used in implementing a channelization circuit.

FPGAs can include several different types of programmable logic blocks in the array. For example, FIG. 4 illustrates an FPGA architecture (400) that includes a large number of different programmable tiles including multi-gigabit transceivers (MGTs 401), configurable logic blocks (CLBs 402), random access memory blocks (BRAMs 403), input/output blocks (IOBs 404), configuration and clocking logic (CONFIG/CLOCKS 405), digital signal processing blocks (DSPs 406), specialized input/output blocks (I/O 407), for example, e.g., clock ports, and other programmable logic 408 such as digital clock managers, analog-to-digital converters, system monitoring logic, and so forth. Some FPGAs also include dedicated processor blocks (PROC 410) and internal and external reconfiguration ports (not shown).

In some FPGAs, each programmable tile includes a programmable interconnect element (INT 411) having standardized connections to and from a corresponding interconnect element in each adjacent tile. Therefore, the programmable interconnect elements taken together implement the programmable interconnect structure for the illustrated FPGA. The programmable interconnect element INT 411 also includes the connections to and from the programmable logic element within the same tile, as shown by the examples included at the top of FIG. 4.

For example, a CLB 402 can include a configurable logic element CLE 412 that can be programmed to implement user logic plus a single programmable interconnect element NT 411. A BRAM 403 can include a BRAM logic element (BRL 413) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 406 can include a DSP logic element (DSPL 414) in addition to an appropriate number of programmable interconnect elements. An IOB 404 can include, for example, two instances of an input/output logic element (IOL 415) in addition to one instance of the programmable interconnect element INT 411. As will be clear to those of skill in the art, the actual I/O pads connected, for example, to the I/O logic element 415 are manufactured using metal layered above the various illustrated logic blocks, and typically are not confined to the area of the input/output logic element 415.

In the pictured embodiment, a columnar area near the center of the die (shown shaded in FIG. 4) is used for configuration, clock, and other control logic. Horizontal areas 409 extending from this column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual FPGA more than one adjacent column of CLBs is typically included wherever the CLBs appear, to facilitate the efficient implementation of user logic.

The present invention is thought to be applicable to a variety of systems for multicarrier modulation and/or demodulation. Other aspects and embodiments will be apparent to those skilled in the art from consideration of the specification. It is intended that the specification and illustrated embodiments be considered as examples only, with a true scope and spirit of the invention being indicated by the following claims.

What is claimed is:

1. A channelization circuit for channelizing a plurality of baseband signals in a plurality of channels of a wideband signal, the channelization circuit comprising:
   a phase shifter circuit configured to receive the plurality of baseband signals;

wherein the plurality of baseband signals include P subsets of the plurality of baseband signals, each subset having a respective ordinal number in a range from zero to P minus one;

wherein the phase shifter circuit is configured to multiply each baseband signal in each subset by a plurality of powers of one of P complex roots of unity, the one of the P complex roots for each baseband signal in each subset corresponding to the respective ordinal number of the subset;

an M-point Fourier transform circuit coupled to the phase shifter circuit;

wherein the Fourier transform circuit is configured to frequency translate the plurality of baseband signals that are phase shifted by the phase shifter circuit to the plurality of channels;

a plurality of M filtering circuits coupled to the Fourier transform circuit;

a plurality of P commutator circuits coupled to the plurality of filtering circuits;

wherein P evenly divides M without any remainder; and a summation circuit coupled to the plurality of commutator circuits, wherein the summation circuit is configured to generate the wideband signal.

2. The channelization circuit of claim 1, wherein:
the plurality of baseband signals have a first sample rate; and
the wideband signal has a second sample rate that is at least a factor of two less than a product of a number of the plurality of baseband signals and the first sample rate.

3. The channelization circuit of claim 2, wherein the factor equals a number of the plurality of commutator circuits.

4. The channelization circuit of claim 1, wherein:
the plurality of baseband signals have a first sample rate;
the wideband signal has a second sample rate that is an integer multiple of the first sample rate; and
the integer multiple is a result from evenly dividing M by P.

5. The channelization circuit of claim 4, wherein:
a spacing between the plurality of channels of the wideband signal corresponds to a result from dividing the second sample rate by M; and
the spacing corresponds to a result from dividing the first sample rate by P.

6. The channelization circuit of claim 1, wherein:
P equals two;
the plurality of baseband signals include a plurality of even baseband signals and a plurality of odd baseband signals;
wherein the respective ordinal number of each even baseband signal is even and the respective ordinal number of each odd baseband signal is odd;
the phase shifter circuit is configured to pass each even baseband signal; and
the phase shifter circuit includes a multiplexer for each odd baseband signal,
wherein the multiplexer is configured to select an alternating one of the odd baseband signal and an inversion of the odd baseband signal.

7. The channelization circuit of claim 1, wherein:
P equals four;
the plurality of baseband signals include a first, a second, a third, and a fourth subset of the plurality of baseband signals;
each baseband signal has an in-phase component and a quadrature-phase component;

the phase shifter circuit is configured to pass the in-phase and quadrature-phase components for each baseband signal in the first subset;

for each baseband signal in the second subset,
the phase shifter circuit includes a first multiplexer that is configured to output an in-phase component and a second multiplexer that is configured to output a quadrature-phase component,
wherein the first multiplexer selects a rotating one of the in-phase component of the baseband signal, the quadrature-phase component of the baseband signal, a first inverse of the in-phase component, or a second inverse of the quadrature-phase component, and
wherein the second multiplexer selects a rotating one of the quadrature-phase component, the first inverse, the second inverse, or the in-phase component;

for each baseband signal in the third subset,
the phase shifter circuit includes a first multiplexer that is configured to output an in-phase component and a second multiplexer that is configured to output a quadrature-phase component,
wherein the first multiplexer selects an alternating one of the in-phase component of the baseband signal and an inverse of the in-phase component, and
wherein the second multiplexer selects an alternating one of the quadrature-phase component of the baseband signal or an inverse of the quadrature-phase component; and for each baseband signal in the fourth subset,
the phase shifter circuit includes a first multiplexer that is configured to output an in-phase component and a second multiplexer that is configured to output a quadrature-phase component,
wherein the first multiplexer selects a rotating one of the in-phase component of the baseband signal, a first inverse of the quadrature-phase component of the baseband signal, a second inverse of the in-phase component, or the quadrature-phase component, and
wherein the second multiplexer selects a rotating one of the quadrature-phase component, the in-phase component, the first inverse, or the second inverse.

8. The channelization circuit of claim 1, wherein:
the M filtering circuits use a sequence of filtering coefficients specifying a bandwidth of the plurality of baseband signals in the plurality of channels, each filtering circuit having a respective first ordinal number in a range from zero to M minus one, each filtering circuit using each filtering coefficient in the sequence at the respective first ordinal number plus each of a plurality of integer multiples of M;
the M filtering circuits include P subsets of the M filtering circuits, each subset including a number of the M filtering circuits equaling a result from evenly dividing M by P, each subset having a respective second ordinal number in a range from zero to P minus one;
associated with each subset is a time delay inserted between each filtering circuit in the subset and the summation circuit, a magnitude of the time delay equaling a multiple of a sample period for the plurality of baseband signals, the multiple equaling the respective second ordinal number of the subset; and
each commutator circuit of the P commutator circuits is coupled to each filtering circuit in a respective one of the P subsets for up-sampling by a factor equaling the result from evenly dividing M by P.

9. The channelization circuit of claim 1, wherein:
the M filtering circuits use a sequence of filtering coefficients specifying a bandwidth of the plurality of baseband signals in the plurality of channels;
each filtering circuit has a respective ordinal number in a range from zero to M minus one; and
each filtering circuit uses each filtering coefficient in the sequence at the respective ordinal number plus each of a plurality of integer multiples of M.

10. The channelization circuit of claim 1, wherein:
the M filtering circuits include P subsets of the M filtering circuits, each subset including a number of the M filtering circuits equaling a result from evenly dividing M by P, each subset having a respective ordinal number in a range from zero to P minus one; and
associated with each subset is a time delay inserted between each filtering circuit in the subset and the summation circuit, a magnitude of the time delay equaling a multiple of a sample period for the plurality of baseband signals, the multiple equaling the respective ordinal number of the subset.

11. The channelization circuit of claim 1, wherein:
the M filtering circuits include P subsets of the M filtering circuits, each subset including a number of the M filtering circuits equaling a result from evenly dividing M by P; and
each commutator of the P commutator circuits is coupled to each filtering circuit in a respective one of the P subsets for up-sampling by a factor equaling the result from evenly dividing M by P.

12. The channelization circuit of claim 11, wherein the summation circuit sums a plurality of respective up-sampled outputs from the P commutator circuits.

13. The channelization circuit of claim 1, wherein the summation circuit sums a plurality of respective up-sampled outputs from the P commutator circuits.

14. A channelization circuit for channelizing M baseband signals into M channels of a wideband signal, the channelization circuit comprising:
a phase shifter circuit configured to generate M phase-shifted signals that phase shift the M baseband signals by P complex roots of unity, P evenly dividing M without any remainder;
wherein the M baseband signals include P subsets, each subset having a respective ordinal number in a range from zero to P minus one;
wherein the phase shifter circuit is further configured to generate one of the M phase-shifted signals for each baseband signal in each subset, the one of the M phase-shifted signals being a product of the baseband signal and a plurality of successive powers of one of the P complex roots of unity, the one of the P complex roots corresponding to the respective ordinal number of the subset;
an M-point Fourier transform circuit coupled to the phase shifter circuit and configured to frequency translate the M phase-shifted signals into the M channels;
M filtering circuits coupled to the M-point Fourier transform circuit and configured to filter the M channels;
P commutator circuits coupled to the M filtering circuits and configured to up-sample by an integer factor that is M evenly divided by P; and
a summation circuit coupled to the P commutator circuits and configured to generate the wideband signal.

15. The channelization circuit of claim 14, wherein:
the M filtering circuits use a sequence of filtering coefficients specifying a retained bandwidth of the M baseband signals;
each filtering circuit has a respective ordinal number in a range from zero to M minus one; and
each filtering circuit uses each filtering coefficient in the sequence at the respective ordinal number plus each of a plurality of integer multiples of M.

16. The channelization circuit of claim 14, wherein:
the M filtering circuits include P subsets of the M filtering circuits, each subset including a number of the M filtering circuits equaling the integer factor, each subset having a respective ordinal number in a range from zero to P minus one;
associated with each subset is a time delay inserted between each filtering circuit in the subset and the summation circuit, a magnitude of the time delay equaling a multiple of a sampling period for the M baseband signals, the multiple equaling the respective ordinal number of the subset; and
each commutator circuit of the P commutator circuits is coupled to each filtering circuit in a respective one of the P subsets for up-sampling by the integer factor.

17. The channelization circuit of claim 14, wherein the summation circuit sums a plurality of respective up-sampled outputs from the P commutator circuits.

* * * * *